UNITED STATES PATENT OFFICE.

EUGEN SCHAAL, OF FEUERBACH, NEAR STUTTGART, WÜRTEMBERG, GERMANY.

MANUFACTURE OF RESIN-ACID ETHERS.

SPECIFICATION forming part of Letters Patent No. 368,494, dated August 16, 1887.

Application filed June 9, 1887. Serial No. 240,798. (No specimens.) Patented in England July 10, 1886, No. 9,027; in France November 10, 1886, No. 164,485; in Italy December 31, 1886, XLI, 376; in Germany January 28, 1887, No. 38,467, and in Belgium February 15, 1887, No, 76,193.

*To all whom it may concern:*

Be it known that I, EUGEN SCHAAL, a subject of the King of Würtemberg, residing at Feuerbach, near Stuttgart, in the Kingdom of Würtemberg and German Empire, have invented new and useful Improvements in the Manufacture of Resin-Acid Ethers, (for which I have received Letters Patent in France, No. 164,485, dated November 10, 1886; in England, No. 9,027, dated July 10, 1886; in Germany, No. 38,467, dated January 28, 1887; in Italy, XLI, 376, dated December 31, 1886, and in Belgium, No. 76,193, dated February 15, 1887,) of which the following is a specification.

This invention relates to an improvement in the process for manufacturing resin-acid ethers which I have described and claimed in Letters Patent No. 335,485, granted to me February 2, 1886. In this patent it is stated that the raw resin acids are in the first instance freed from volatile or soft constituents by distillation or extraction. In the new process, which constitutes the subject-matter of my present invention, the operation above named is combined with the distillation, which constitutes the last step of the process.

The formation of resin-acid ethers takes place by the combination of resin acids of any kind with all kinds of alcohols, carbohydrates, and the derivatives thereof, as stated in my Patent No. 335,485, above named. I can also use mixtures of different resin acids and mixtures of different alcohols.

First example: I take one hundred parts of colophony and add thereto from ten to eleven parts of glycerine, free from water, and then I subject the mixture to a temperature approaching 250° centigrade under a pressure of from thirty to fifty pounds to the square inch for about six hours, or until the conversion into ether has been completed, the steam formed during the process of heating being permitted to escape. The fact that the conversion into ether has been completed can be ascertained by the insolubility of the mass in carbonate of soda. After the conversion into ether has been completed the mass is subjected to a distillation *in vacuo*, the temperature being gradually raised to 310° centigrade, whereby oily parts and the soft ethers are distilled off, while the hard ethers remain in the retort.

Second example: I take one hundred parts of colophonium and forty-seven parts of naphthol and dissolve the same in one hundred and fifty parts of anhydrous alcohol. Then I introduce anhydrous hydrochloric acid until the solution is saturated, or I add to the solution about forty parts of strong sulphuric acid of about 1,854° specific gravity and boil for about half an hour. After permitting the mass to stand for about half a day the ether begins to separate, and such ether is purified by washing with water and with carbonate of soda, and finally subjected to a distillation *in vacuo*, the temperature being carried up to 310° centigrade, whereby oily parts and the soft ethers are distilled off, while the hard ethers remain in the retorts.

The ethers which I use for the production of varnishes vary in hardness between that of mastic and that of molten opal. They are insoluble in carbonate of soda and in alcohol, but they are easily soluble in benzone, ether, oil of turpentine, and fatty oils—such as linseed-oil—and when dissolved in these substances they form varnishes which are equal to the ordinary copal varnish.

What I claim as new, and desire to secure by Letters Patent, is—

1. The method of preparing resin-acid ether by condensing the resin acids to ether by treatment with alcohols or phenols in the presence of heat, with or without pressure, and with or without addition of substances favoring the reaction, and finally separating the mixture of resin-acid ethers resulting from the reaction by fractional distillation *in vacuo*, according to the hardness of the different constituents of the mixture.

2. The method of preparing resin-acid ether by condensing resin acids to ether by treatment with alcohols or phenols, and with a mineral acid in the presence of heat, and finally separating the mixture of resin-acid ethers resulting from the above-named reaction by fractional distillation *in vacuo*, according to the hardness of the different constituents of the mixture.

In testimony whereof I have hereunto set my hand and seal in the presence of two subscribing witnesses.

EUGEN SCHAAL. [L. S.]

Witnesses:
 FRIEDRICH HEZEL,
 CARL WERNLE.